Sept. 17, 1963    R. N. McCLEERY ETAL    3,103,685
PUMP FOR WINDSHIELD CLEARING SYSTEM AND THE LIKE
Filed Feb. 8, 1962    5 Sheets-Sheet 1
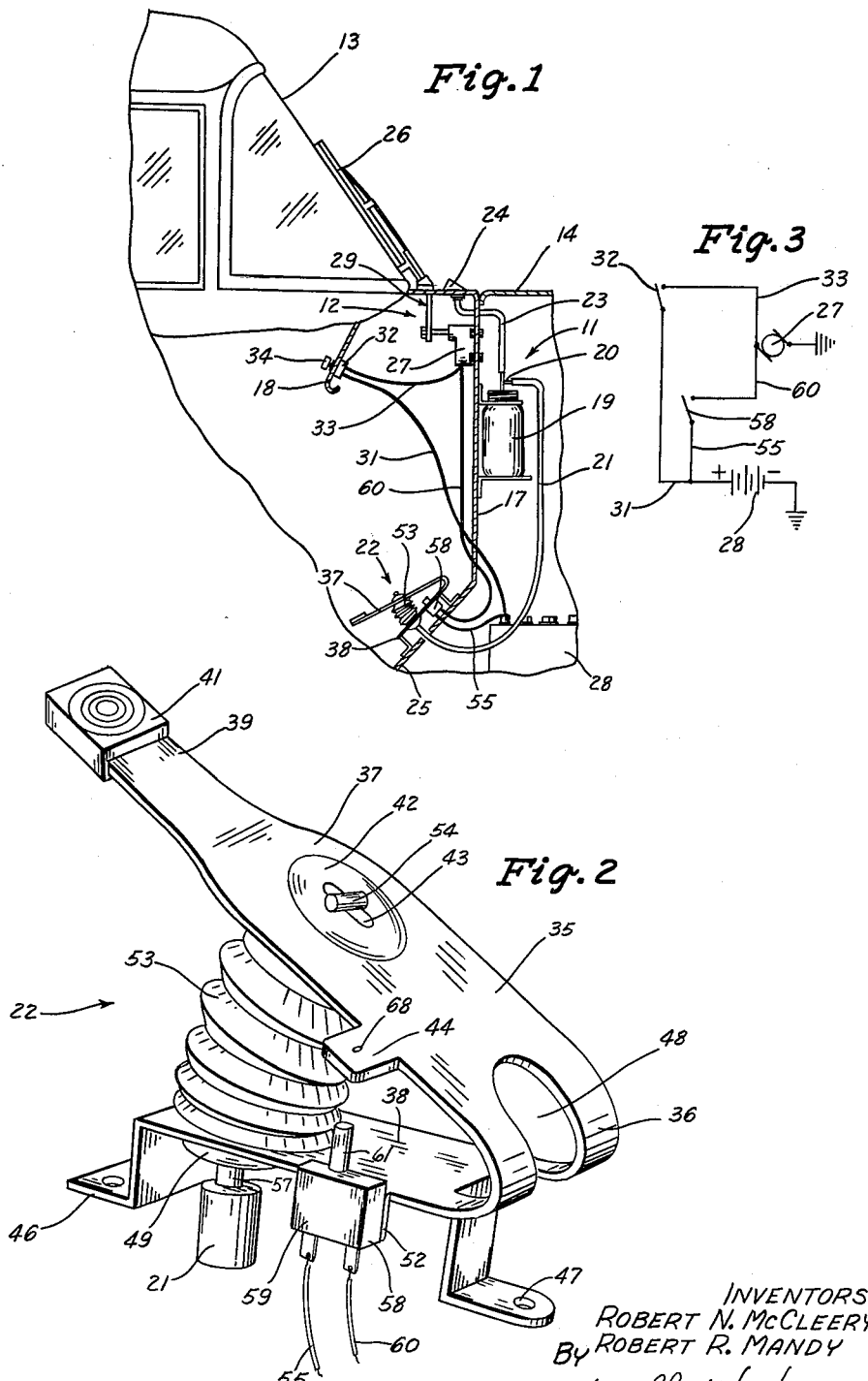
INVENTORS
ROBERT N. McCLEERY
ROBERT R. MANDY
By Lowell & Henderson
ATTORNEYS Sept. 17, 1963    R. N. McCLEERY ETAL    3,103,685
PUMP FOR WINDSHIELD CLEARING SYSTEM AND THE LIKE
Filed Feb. 8, 1962    5 Sheets-Sheet 2
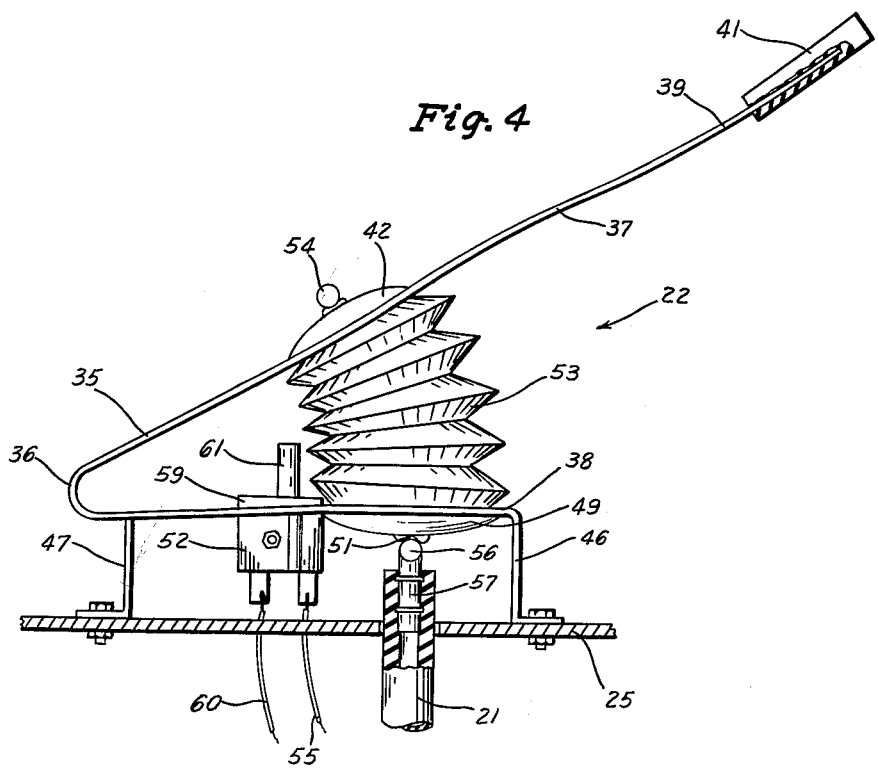
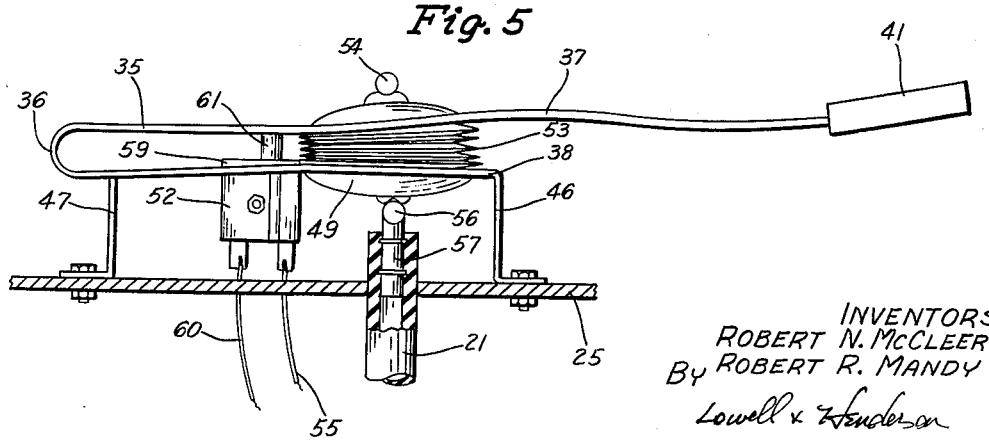
INVENTORS
ROBERT N. McCLEERY
ROBERT R. MANDY
By Lowell & Henderson
ATTORNEYS

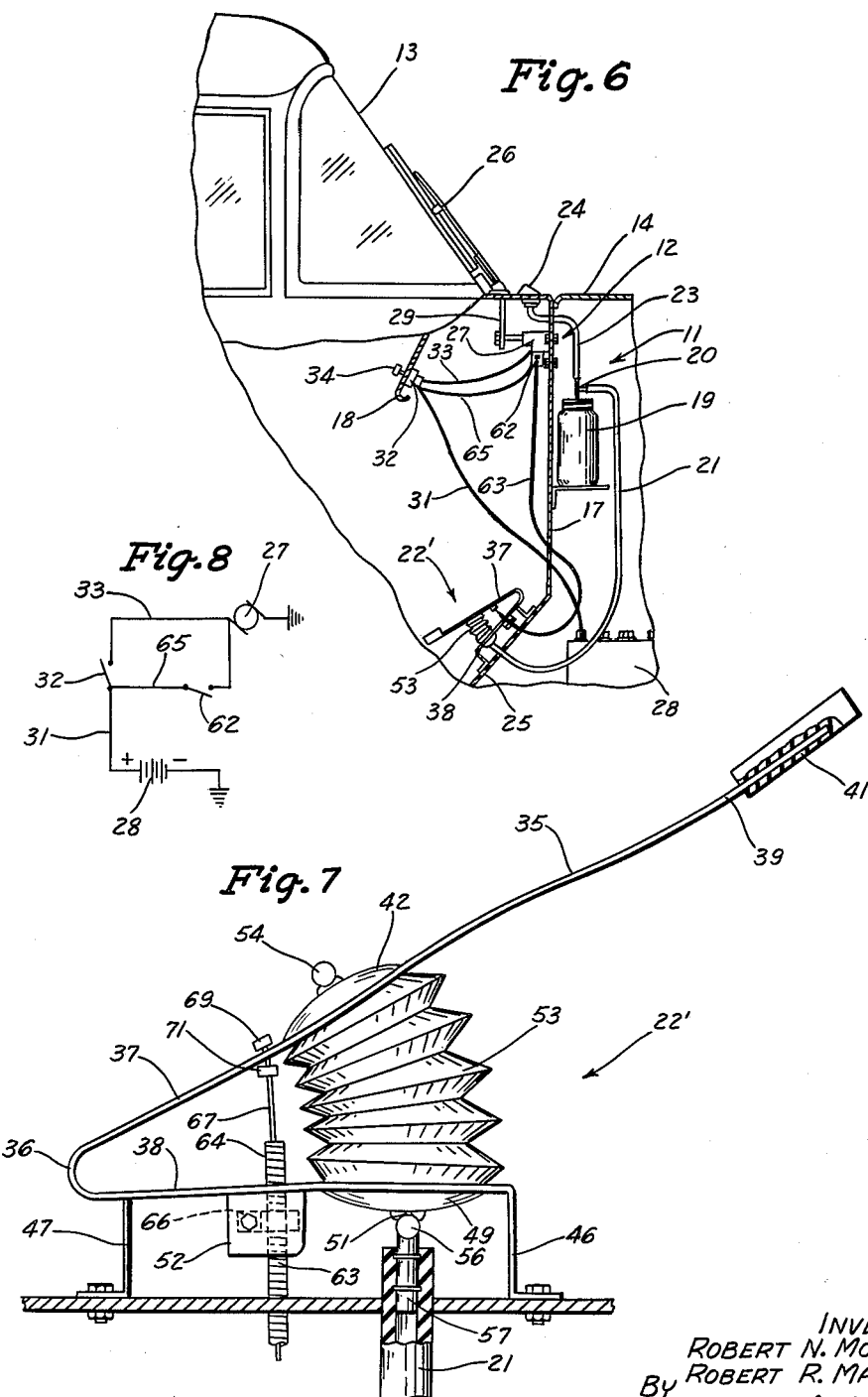

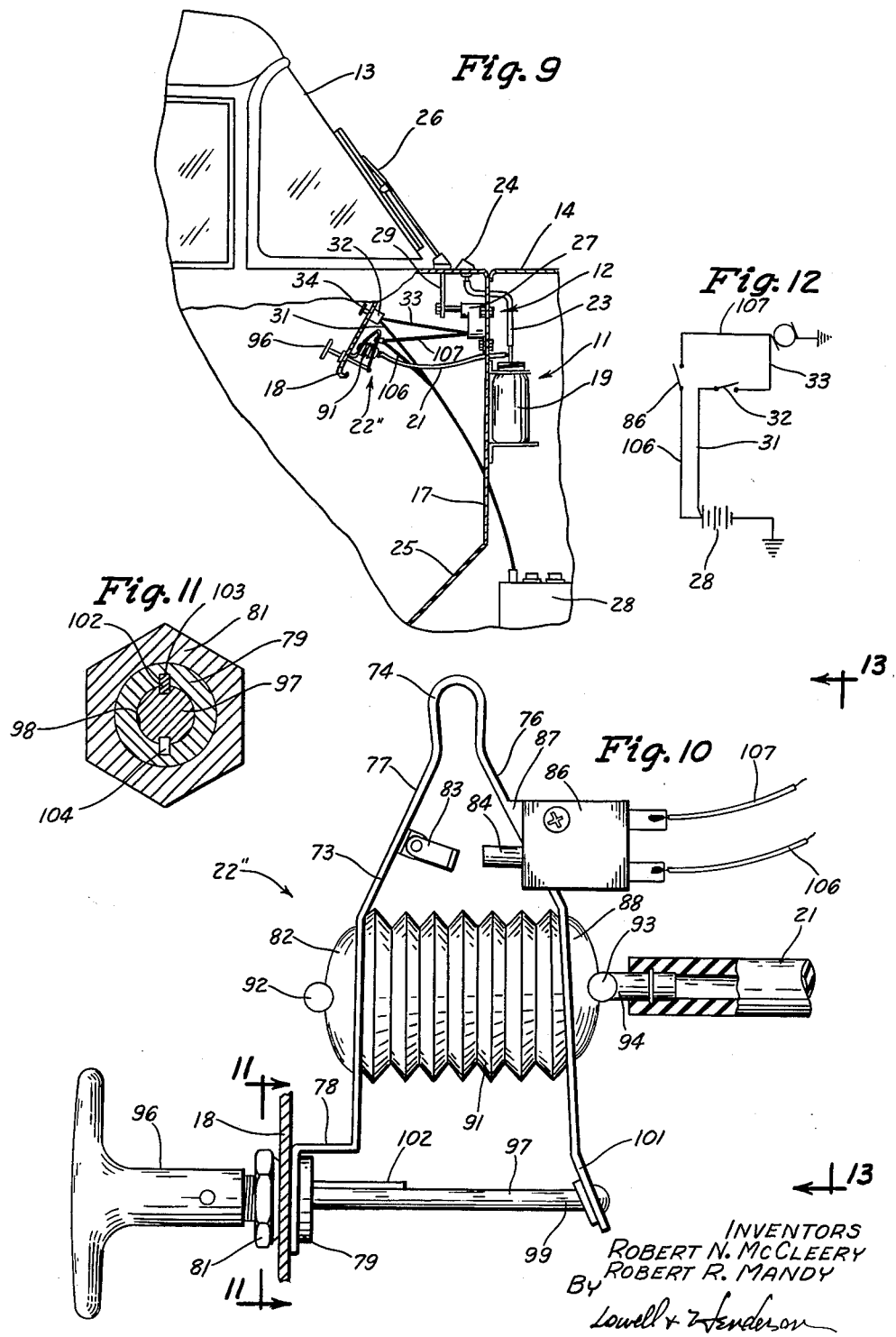

Sept. 17, 1963  R. N. McCLEERY ETAL  3,103,685
PUMP FOR WINDSHIELD CLEARING SYSTEM AND THE LIKE
Filed Feb. 8, 1962  5 Sheets-Sheet 5
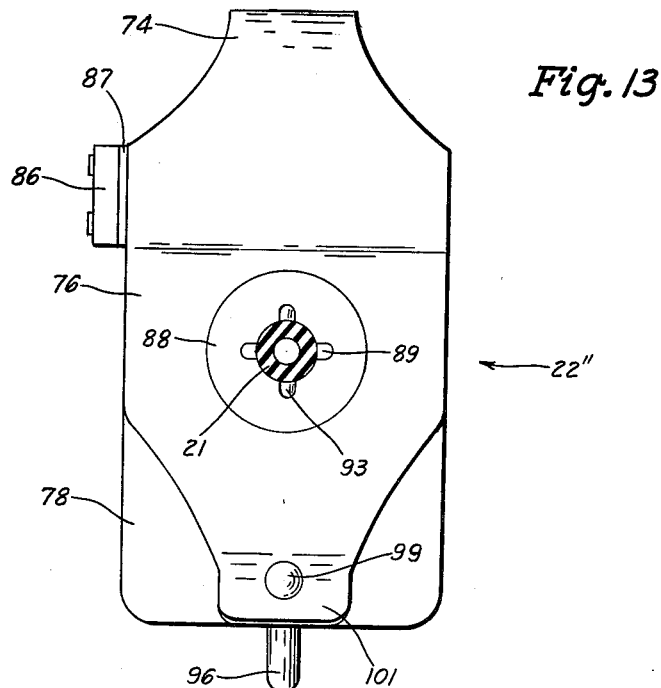
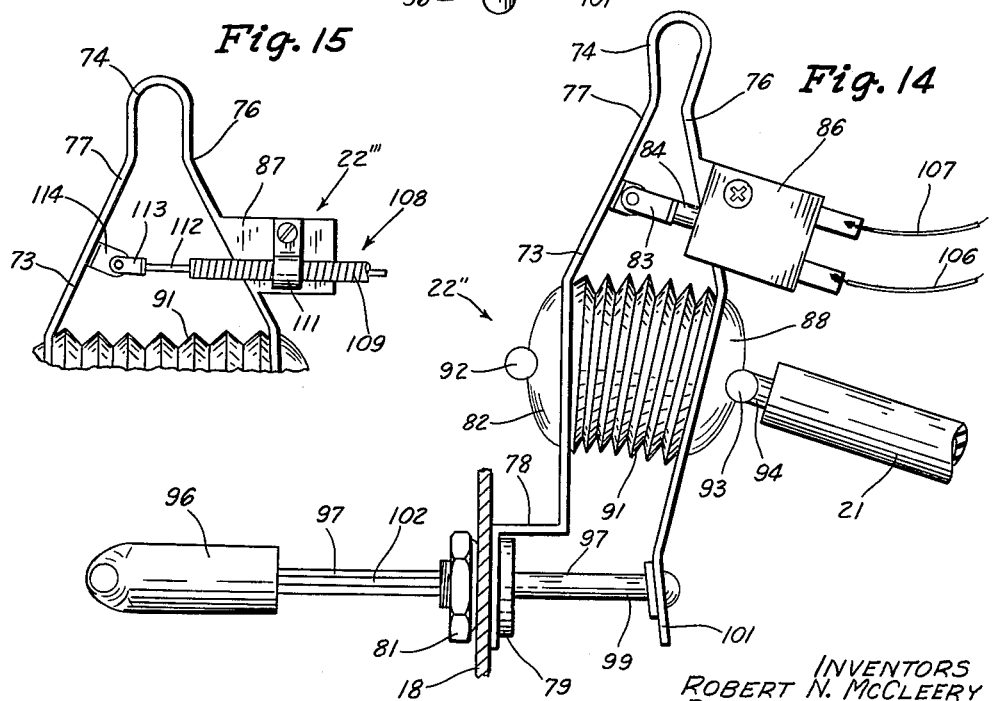
INVENTORS
ROBERT N. McCLEERY
ROBERT R. MANDY
BY
Lowell & Henderson
ATTORNEYS

United States Patent Office 3,103,685
Patented Sept. 17, 1963

3,103,685
PUMP FOR WINDSHIELD CLEARING SYSTEM AND THE LIKE
Robert N. McCleery and Robert R. Mandy, Detroit, Mich., assignors to The Delman Company, Cookeville, Tenn., a corporation of Tennessee
Filed Feb. 8, 1962, Ser. No. 171,946
3 Claims. (Cl. 15—250.02)

This invention relates generally to a windshield clearing system for vehicles and more particularly to a pump assembly for the system.

An object of this invention is to provide a novel pump assembly for a vehicle windshield clearing system.

Another object of this invention is to provide means for operating the wiper unit in response to operation of the pump assembly of the washer unit to assure oscillaiton of the wiper blade when fluid is discharged against the windshield.

A further object of this invention is to provide a windshield clearing system that utilizes a pump assembly having a unitary, reversely bent resilient member within which a resilient bellows is mounted, and wherein the pump assembly is operatively connected to the wiper motor for coordinating operation of both washer and wiper units of the clearing system.

Yet another object of this invention is to provide a structure capable of attaining the above mentioned objectives which is economical to manufacture, simple of construction, and effective in operation.

These objects and other features and advantages of this invention will become readily apparent from the following description when taken in conjunction with the accompanying drawings, wherein:

FIG. 1 is a fragmentary side elevational view of a vehicle showing the windshield clearing system of this invention in assembly relation therewith;

FIG. 2 is an enlarged perspective view of the pump assembly of this invention;

FIG. 3 is a diagram of an electric circuit for the windshield clearing system;

FIG. 4 is a side elevational view of the pump assembly shown in a normal inoperative position;

FIG. 5 is a side elevational view of the pump assembly shown in an operative position;

FIG. 6 is a fragmentary side elevational view of a vehicle showing a modified windshield clearing system in assembly relation therewith;

FIG. 7 is an enlarged side elevational view of the pump assembly for the modified system of FIG. 6;

FIG. 8 is a diagram of the electric circuit for the modified system;

FIG. 9 is a fragmentary side elevational view of a vehicle showing a second modified windshield clearing system in assembly relation therewith;

FIG. 10 is an enlarged side elevational view of the pump assembly of the FIG. 9 embodiment;

FIG. 11 is a cross sectional view taken along the line 11—11 in FIG. 10;

FIG. 12 is a diagram of the electric circuit for the FIG. 9 system;

FIG. 13 is an elevational view taken along the line 13—13 in FIG. 10;

FIG. 14 is a view similar to FIG. 10 showing the pump assembly thereof in an operative position; and FIG. 15 is a fragmentary view of yet another modified pump assembly.

Referring to the drawing, a vehicle windshield clearing system is disclosed which includes a washer unit and a wiper unit designated generally in FIG. 1 at 11 and 12, respectively. The vehicle is illustrated as having a windshield 13, an engine cowl 14 extended forwardly of the windshield, a fire wall 17 and a dashboard 18.

The washer unit 11 includes a fluid reservoir 19 mounted on the fire wall 17 for supplying fluid through a three-way valve 20 and a conduit 21 to a fluid pump assembly 22. The pump assembly 22 is mounted upon the toe board 25 of the vehicle, and upon operation withdraws fluid from the reservoir 19 and expels the fluid through another conduit 23 to one or more nozzles 24. Each nozzle 24 is mounted on the cowl 14 at a position forwardly of the windshield 13, and is adapted to discharge the fluid upwardly onto the windshield and into the path of movement of a wiper blade 26, which forms a part of the wiper unit 12.

The wiper unit 12 also includes an electric wiper motor 27 of a conventional type which is mounted on the fire wall 17, and which is energized by a battery 28 to drive the wiper blade 26 in an oscillating manner across the windshield 13 by means of the usual transmission mechanism indicated generally at 29 (FIG. 1). The battery 28 is connected in an electric circuit which includes a lead 31 to an on-off rotatable hand control switch 32 mounted on the dashboard 18, and another lead 33 connected between the control switch 32 and the wiper motor 27. For independent operation of the wiper motor 27 and thus the wiper unit 12, a knob 34 on the control switch 32 is merely rotated between on and off positions.

The pump assembly 22 (FIG. 2) comprises a unitary member 35 of spring steel material reversely bent at 36 in a V-shaped manner to form an upper actuator leg 37 and a lower mounting leg 38 yieldably movable toward each other. The actuator leg 37 is narrowed at its outer end 39 to accommodate a pedal or foot pad 41 for engagement by the foot of the vehicle operator. Centrally of the actuator leg 37 there is formed an outwardly extended circular depressed portion 42 (FIG. 4) having an elongated slot 43. At one side of the actuator leg 37, an extension 44 is provided for a purpose hereinafter described.

The lower mounting leg 38 is U-shaped in side elevation adapting the leg 38 to serve as a means for mounting the pump assembly 22 on the toe board 25. One end 46 of the mounting leg 38 is bent downwardly and outwardly as illustrated in FIG. 4, and the other end 47, shaped similarly to the end 46, is cut out from the member 35 leaving an opening 48 (FIG. 2) formed therein. A circular depressed portion 49 is formed centrally in the mounting leg 38 and includes an elongated slot 51 (FIG. 4) formed centrally therein. Formed on one side of the mounting leg 38 is a flange 52 which depends at right angles to the main plane of the leg 38.

To withdraw fluid from the reservoir 19 and to expel the withdrawn fluid through the nozzles 24, a resilient hollow bellows 53 (FIG. 2) is provided and which is nested in the opposed portions 42 and 49. The bellows 53 includes a T-shaped knob 54 at its upper end for bayonet-type insertion through the slot 43 in the actuator leg 37 for locking engagement therewith. The bellows 53 is also provided with a combined T-shaped knob 56 (FIG. 4) and fluid fitting 57 at its lower end for bayonet-type insertion through a slot 51 in the mounting leg 38 for locking engagement therewith. The fitting 57 is connected to the conduit 21 whereby fluid can flow between the bellows 53 and the valve 20.

In the normal position of the pump assembly 22 (FIG. 4), the bellows 53 is expanded. However, upon a depressing movement of the actuator leg 37 toward the mounting leg 38 by pressing engagement thereon of the operator's foot, the bellows 53 is depressed (FIG. 5) and forced into a contracted position, thus expelling fluid outwardly of the bellows and through the conduit 21. Upon a subsequent release of the actuator leg 37 by the operator, the leg 37 springs back to its normal position of FIG. 4 due to the inherent resiliency of the unitary member 35. This movement aided by the resiliency of the bellows 53 itself, results in an expansion of the bellows thus withdrawing a predetermined quantity of fluid from the reservoir 19 into the interior of the bellows 51.

As mentioned hereinbefore, independent operation of the wiper motor 27 is provided by closing the switch 32 (FIG. 3) by means of the knob 34. For coordinated operation of both washer and wiper units 11 and 12, respectively, the pump assembly 22 is provided with an electric switch 58 (FIGS. 2 and 3) interposed in the electric circuit and connected by leads 55 and 60 between the battery 28 and the wiper motor 27.

The switch 58 includes a switch box 59, mounted on the flange 52 of the stationary mounting leg 38, and a movable plunger 61. For coaction with the plunger 61, the extension 44 of the actuator leg 37 is provided. The arrangement is such that when the actuator leg 37 is depressed to effect a discharge of fluid from the bellows 53, the extension 44 moves into contacting engagement with the plunger 61 to close the switch 58 and energize the circuit for the wiper motor 27. Thus, in response to a depression of the actuator leg by the operator, both washer and wiper units operate substantially simultaneously to discharge fluid against the windshield 13 and to oscillate the wiper blade 26 across the windshield.

When released, the actuator leg 37 springs back to its normal position of FIG. 4, whereupon the extension 44 is moved away from the plunger 61 to open the switch 58 and stop the operation of the wiper unit 12. Even though the bellows 53 has been depressed and has exhausted its supply of fluid against the windshield 13, it will be apparent that so long as the actuator leg 37 remains depressed by the operator's foot, the switch 58 will remain closed and the wiper motor 27 will continue to oscillate the wiper blade 26 across the windshield 13.

Referring to FIGS. 6–8 inclusive, a modified windshield clearing system is disclosed, with like reference numbers indicating like parts with respect to the embodiment of FIGS. 1–5 inclusive.

For independent operation of the wiper motor 27, the knob 34 is rotated to close the switch 32. However, to provide coordinated control of both the washer and wiper units 11 and 12, respectively, an on-off electric switch 62 (FIGS. 6 and 8) is mounted on the wiper motor 27. The switch 62 is connected in the circuit by lead 65 and is mechanically connected to the pump assembly 22' by a push-pull Bowden wire 63.

The sheath or casing 64 (FIG. 7) of the Bowden wire 63 is fastened to the flange 52 of the mounting leg 38, as by a clamp device 66, and the control wire 67 is extended through a small opening 68 (see FIG. 2) formed therefor in the extension 44. To secure the wire 67 to the extension 44, so that the wire 67 moves longitudinally within the casing 64 in response to movement of the actuator leg 37, a pair of beads 69 and 71 (FIG. 7) are secured in spaced relation to the wire 67 and on opposite sides of the extension 44.

Consequently, upon a depressing movement of the actuator leg 37 (FIG. 7) to contract the bellows 53 and effect a discharge of fluid through the nozzle 24 and against the windshield 13, the movement of the actuator leg 37 is transmitted into a push movement of the wire 67 through the casing 64 to effect a closing of the switch 62 (FIG. 8). This results in operation of the wiper motor 27. Thus, coordinated operation of both washer and wiper units 11 and 12, respectively, is obtained.

As long as the actuator leg 37 is held depressed to close the switch 62, the wiper motor 27 will continue to operate, irrespective of the cessation of the discharge of fluid against the windshield. However, when the actuator leg 37 is finally released by the operator for return to its normal position of FIG. 7, the wire 67 is pulled upwardly and through the casing 64 to open the switch 62 and stop the wiper motor 27 operation.

Referring to FIGS. 9–14, inclusive, another modified windshield clearing system is disclosed, with like reference numbers indicating like parts with respect to the embodiment of FIGS. 1–5. The wiper unit 12 is unchanged, with the wiper motor 27 operable by closing the electric switch 32 to oscillate the wiper blade 26 across the windshield 13.

The washer unit 11, however, includes a pump assembly 22" which is mounted on the dashboard 18 for hand operation, as compared to foot operation of the pump assemblies 22 and 22' in the FIGS. 1–5 and FIGS. 6–8 embodiments. The pump assembly 22" comprises a unitary member 73 (FIG. 10) of spring steel material reversely bent at 74 in a V-shaped manner to form an actuator leg 76 and a mounting leg 77 yieldably movable toward each other.

The mounting leg 77 is formed at one end 78 for stationary mounting to the dashboard 18, as by a bushing 79 and a nut 81. Centrally of the mounting leg 77, a circular depressed portion 82 is formed and which includes an elongated slot (not shown). A tab 83 is secured to the mounting leg 77 for coaction with the plunger 84 of an electric switch 86 secured to a flange 87 formed on the opposed, movable actuator leg 76.

A circular depressed portion 88 is formed on the actuator leg 76 and has an elongated slot 89 (FIG. 13) formed therein. A resilient, hollow bellows 91 is mounted between the legs 76 and 77, being nested in the portions 82 and 88, and includes a pair of T-shaped knobs 92 and 93 (FIG. 10) for respective, bayonet-type insertions through the slots formed therefor in the legs 76 and 77. By this arrangement, the bellows 91 is lockingly engaged between the legs 76 and 77. A fluid fitting 94 (FIG. 10) is integral with the knob 93 for fluidly connecting the interior of the bellows 91 with the conduit 21 to the valve 20.

To depress or pull the actuator leg 76 toward the mounting leg 77, and thereby operate both washer and wiper units 11 and 12 (FIG. 9) substantially simultaneously, a T-shaped handle 96 is provided on the operator side of the dashboard 18. The handle 96 is secured to a shaft 97 which extends through a bore 98 (FIG. 11) in the bushing 79 and the inner end 99 (FIG. 10) of which is secured to the narrowed end 101 (FIGS. 10 and 13) of the actuator leg 76.

A key 102 is formed on the shaft 97 for reciprocation through either of two keyways 103 and 104 (FIG. 11) provided therefor in the bushing 79. Thus, when the handle 96 is pulled outwardly or to the left in FIG. 10 to actuate the pump assembly 22", the handle 96 can either be held manually in the retracted position or it can be locked therein by being rotated to a position (FIG. 14) where the key 102 is not in registration with either keyway 103 or 104.

In response to the actuator leg 76 being pulled toward the mounting leg 77, the bellows 91 (FIG. 14) is contracted and expels fluid through the fitting 94 and the conduit 21 to discharge the fluid through the nozzle 24 against the windshield 13 (FIG. 9). As the switch 86 (FIGS. 10 and 12) is electrically connected in the circuit with the battery 28 by leads 106 and 107, movement of the actuator leg 76 which effects an engagement of the switch plunger 84 with the tab 83 closes the switch 86 and energizes the wiper motor 27. Coordinated operation of both the washer and wiper units 11 and 12 thereby results upon a pulling outwardly of the handle 96 by the operator.

When the quantity of fluid in the bellows 91 has been expelled, the operator can either manipulate the handle 96 to permit its return to its normal position of FIG. 10, due to the springing back of the actuator leg 76 to its own normal position, or he can hold the handle 96 in its retracted position. In the first instance, the wiper unit 12 ceases to operate when the plunger 84 moves away from engagement with the tab 83 and opens the switch 86. It can readily be seen, however, that should the handle 96 be held retracted, the switch 86 remains closed thus maintaining the wiper unit 12 in operation irrespective of the cessation of fluid discharge. In either case when the actuator leg 76 returns to its normal position, the bellows 91 expands in response and withdraws fluid from the reservoir 19 to re-charge the bellows 91 for the next operation.

In FIG. 15, a third embodiment of a pump assembly 22''' is disclosed, wherein the pump assembly 22''' is identical to that of the embodiment of FIGS. 9–14 inclusive, with the exception that a Bowden wire device 108 is utilized for transmitting power to energize the wiper motor.

The device 108 includes a sheath or casing 109 secured to the flange 87 as by a clamp 111, and with a control wire 112 pivotally connected by an eye clamp 113 to a projection 114 formed on the mounting leg 77. As was the case in the first modification illustrated in FIGS. 6–8 inclusive, movement of the actuator leg 76 toward the mounting leg 77 effects, in addition to a discharge of fluid by the bellows 91, a push on the control wire 112 through the casing 111 to close a switch at the wiper motor, whereby to effect coordinated operation of both washer and wiper units.

Upon a release of the handle for the pump assembly 22''', movement of the actuator leg 76 away from the mounting leg 77 pulls the control wire 112 back through the casing 111 and opens the wiper motor switch to de-actuate the wiper unit operation substantially simultaneously with cessation of fluid discharge. Additionally, the bellows 91 expands and withdraws fluid from the reservoir in readiness for the next operation.

In summation, an extremely simple operator operated pump assembly is disclosed for a windshield clearing system, providing either independent or coordinated operation of the washer unit relative to the wiper unit of the system. Although an electric wiper motor is utilized herein with the various pump assemblies, it is readily apparent that a conventional suction wiper motor could be substituted therefor.

Although a preferred embodiment and several modifications thereof of the invention have been disclosed herein, various alterations and modifications can be made thereto without departing from the scope of the invention as defined by the appended claims.

We claim:

1. An operator actuated pump comprising a resilient member having a first stationary leg and a second leg springable away from said first leg after movement toward it, each of said legs having a circular depression formed therein with an open slot formed in the depression, and a resilient hollow bellows having knob portions on the top and bottom thereof for bayonet-type insertion through said slots, said bellows nested in said depressions and lockingly engaged with and extended between said legs, said bellows movable between collapsed and expanded positions upon respective movement of said first leg toward and away from said second leg, said bellows including a fluid connection fluidly connected to a source of fluid and operable to sequentially discharge fluid therefrom and draw fluid into itself in response to said respective movement.

2. A pump assembly for the washer system of a vehicle windshield clearing system wherein a liquid drawn from a liquid reservoir by the pump unit is discharged through a nozzle onto the windshield in the path of movement of a wiper blade, said pump assembly comprising a member of yieldable material having a reversely bent shape so as to form a base section adapted for stationary mounting and a lever section yieldably movable toward said base section, said lever section movable automatically away from said base section subsequent to movement toward said base section, a resilient hollow bellows positioned between and connected to said sections and fluidly connected to the reservoir for sequentially discharging fluid through the nozzle and withdrawing fluid from the reservoir in response to movement of said lever section toward and away from said base section.

3. A windshield clearing system comprising an electrically operated windshield wiper motor having energizing circuit means including separate first and second switch control means independently operable for closing and opening said circuit means, a windshield washer pump assembly for delivering washing fluid including a unitary resilient member having a pair of legs with circular depressions formed therein, said legs movable toward and away from each other, and including further a fluid displacing bellows nested in said depressions and contractible in response to movement of one of said legs toward the other to eject fluid onto an associated windshield, and means attached to said one leg for operating said second switch control means to close said circuit means substantially simultaneously with ejection of fluid by said bellows.

References Cited in the file of this patent
UNITED STATES PATENTS

| | | |
|---|---|---|
| 1,510,848 | Hubbard | Oct. 7, 1924 |
| 2,899,901 | Kosbab | Aug. 18, 1959 |
| 2,970,335 | Webb | Feb. 7, 1961 |
| 3,017,650 | Schaal | Jan. 23, 1962 |

FOREIGN PATENTS

| | | |
|---|---|---|
| 216,901 | Australia | Sept. 3, 1958 |